March 6, 1928.
E. C. BILLS
1,661,688
TROLLING SPOON
Filed Feb. 14, 1927
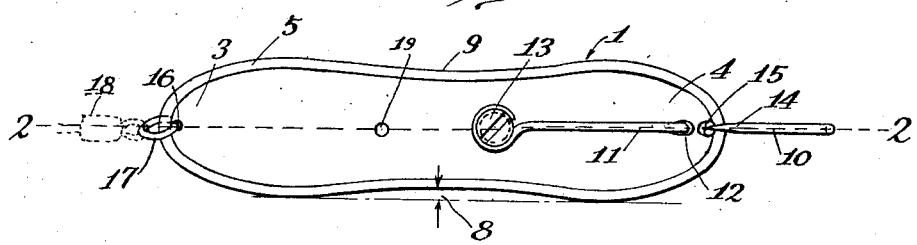
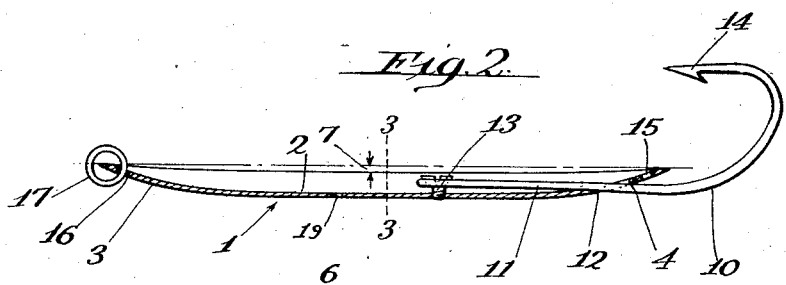
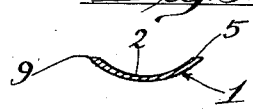
Inventor
Edward C. Bills.
by Hazard and Miller
Attorneys.

Patented Mar. 6, 1928.

1,661,688

UNITED STATES PATENT OFFICE.

EDWARD C. BILLS, OF REDONDO BEACH, CALIFORNIA.

TROLLING SPOON.

Application filed February 14, 1927. Serial No. 168,034.

My invention is a trolling spoon for fishing.

An object of my invention is the construction of a trolling spoon which, when pulled by a line having a swivel connected thereto and also a hook, will dart in different directions through the water as well as turn or rotate on the swivel and in which the action will take place without causing a material disturbance to the water.

A further object is the construction of a shallow trough like spoon which has its side edges slightly concaved inwardly and its upper edge also slightly concaved inwardly the edges being sharp pointed and having a hook connected to the base of the trough so that the spoon in darting hither and thither and turning in the water will not give an undue disturbance to the water but give a clean cut in the forward travel and in the rotation or turning movement.

In constructing my trolling spoon I preferably use a hollow trough shaped piece of metal which is curved concavely on its inner portion transversely of the spoon, the forward and rear ends of the spoon curving upwardly. The side edges are sharpened and there is a slight dip or curvature between the end points and the center of the spoon along the rim. The rim is also curved slightly inwardly at the center. A hook is fastened with the shank in the trough and extending through the rear end and there is a swivel attached to the front end of the spoon.

My invention is illustrated in the accompanying drawings, in which:

Figure 1 is a plan view showing the inner face of the spoon.

Figure 2 is a longitudinal section on the line 2—2 of Fig. 1.

Figure 3 is a transverse section on the line 3—3 of Fig. 2 in the direction of the arrows.

The spoon, designated generally by the numeral 1, is formed of metal and has a concave curvature on the upper surface 2 in a transverse direction, as shown clearly in Fig. 3, and the front end 3 and rear end 4 are also curved upwardly. The rim 5 may be considered as occupying a horizontal plane if the spoon is considered as resting on a horizontal surface on the back 6. This rim has a slight dip as indicated by the dimension line 7 of Fig. 2.

The side edges are curved inwardly as indicated by the dimension line 8 shown in Fig. 1. It will thus be seen that the spoon has a sharp cutting edge 9 around its whole periphery and that this edge has a slight downward dip, as indicated in Fig. 2 considered longitudinally, and is also drawn slightly inwardly at the center as indicated in Fig. 1.

The hook 10 has a stem or shank 11 extending through a slot 12 towards the rear end of the spoon and by means of a screw 13 is secured in position, the stem nesting in the hollow part of the trough like spoon. The prong 14 of the hook is preferably curved backwardly until it is adjacent the rear end of the spoon.

An aperture 15 is provided at the tail end of the spoon, to which may be attached a lure, such as a piece of cloth or other brilliant material to attract fish, and at the other end an aperture 16 provides means for connecting a ring 17 which may be connected to a swivel 18 indicated dotted in Fig. 1.

I found that when using my trolling spoon having a proper swivel that the spoon darts in different directions in the water and also turns and rotates in one direction or the other, sometimes having an oscillating movement, but in all of these movements the water has a smooth flow in regard to the spoon and there is no feather like cutting of the water by the edge of the spoon and moreover it does not leave any trailing disturbance at the tail end of the spoon. I have found great success in trolling with this spoon when the fish would not bite at practically any other trolling implement and I attribute this to the smooth action of the spoon in the water and to the movement simulating that of a fish.

I also provide a threaded aperture 19 in the spoon so that the screw 13 may be shifted to different positions in order to locate the hook in different relations to the spoon.

Various changes may be made in the principles of my invention without departing from the spirit thereof, as set forth in the description, drawings and claims.

I claim:

1. A trolling spoon comprising in combination a spoon structure formed of a metal trough, having a concave inner side and a convex outer side considered transversely, the edges being sharpened and being in substantially a horizontal plane, the trough having upturned ends, the edges at the end being at a slightly higher elevation than the edges at the center part, and the side edges at the center part being spaced closer together than the side edges towards the ends of the spoon structure, a hook having a stem fitted in the trough part of the spoon and rigidly connected thereto on the concave side, said stem extending through a slot adjacent the rear end of the spoon, an aperture adjacent the rear end of the spoon to attach a lure, and means at the forward end of the spoon to attach same to a line.

2. A trolling spoon comprising in combination a spoon structure formed of a metal trough, having a concave inner side and a convex outer side considered transversely, the edges being sharpened and being in substantially a horizontal plane, the trough having upturned ends, the edges at the end being at a slightly higher elevation than the edges at the center part, and the side edges at the center part being spaced closer together than the side edges towards the ends of the spoon structure, a hook having a stem fitted in the trough part of the spoon and rigidly connected thereto, and means to attach a line to the spoon.

3. A trolling spoon comprising in combination a spoon structure formed of a metal trough, having a concave inner side and a convex outer side considered transversely, the edges being sharpened and being in substantially a horizontal plane, the trough having upturned ends, the edges at the end being at a slightly higher elevation than the edges at the center part, and the side edges at the center part being spaced closer together than the side edges towards the ends of the spoon structure, a hook having a stem fitted in the trough part of the spoon and rigidly connected thereto on the concave side, said stem extending through a slot adjacent the rear end of the spoon, and means at the forward end of the spoon to attach same to a line.

In testimony whereof I have signed my name to this specification.

EDWARD C. BILLS.